(12) United States Patent
Solanki et al.

(10) Patent No.: US 11,441,980 B2
(45) Date of Patent: Sep. 13, 2022

(54) DEVICE FOR TEAR ANALYSIS OF FILMS

(71) Applicant: Dow Global Technologies LLC, Midland, MI (US)

(72) Inventors: Sanjay C. Solanki, Midland, MI (US); Donald L. McCarty, II, Midland, MI (US); Robert A. Gunther, Midland, MI (US); Jin Wang, Midland, MI (US); Kyle A. Myers, Midland, MI (US); Margaret C. Hayes, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 95 days.

(21) Appl. No.: 16/630,709

(22) PCT Filed: Apr. 30, 2018

(86) PCT No.: PCT/US2018/030261
§ 371 (c)(1),
(2) Date: Jan. 13, 2020

(87) PCT Pub. No.: WO2019/027520
PCT Pub. Date: Feb. 7, 2019

(65) Prior Publication Data
US 2021/0088427 A1    Mar. 25, 2021

Related U.S. Application Data

(60) Provisional application No. 62/539,025, filed on Jul. 31, 2017.

(51) Int. Cl.
*G01N 3/08* (2006.01)
*B25J 15/00* (2006.01)
(Continued)

(52) U.S. Cl.
CPC .............. *G01N 3/066* (2013.01); *B25J 9/044* (2013.01); *G01N 3/08* (2013.01); *B25J 15/00* (2013.01);
(Continued)

(58) Field of Classification Search
CPC ............ G01N 3/066; G01N 3/08; G01N 3/58; G01N 2203/0017; G01N 2203/0091;
(Continued)

(56) References Cited

U.S. PATENT DOCUMENTS 2,340,401 A    2/1944   Martin
4,606,230 A    8/1986   Scott et al.
(Continued)

FOREIGN PATENT DOCUMENTS

JP    07055669 A    3/1995
JP    10253474 A    9/1998

OTHER PUBLICATIONS

International Search Report and Written Opinion pertaining to PCT/US2018/030261, dated Aug. 10, 2018.
(Continued)

*Primary Examiner* — Jonathan M Dunlap
(74) *Attorney, Agent, or Firm* — Dinsmore & Shohl LLP

(57) ABSTRACT

A system and method for performing a tear test are described herein. The system may include a fixed clamping station configured to hold a first portion of a film specimen and a movable clamp coupled to an actuator, the movable clamp may be configured to hold a second portion of the film specimen. The movable clamp may be configured to move in a direction away from the fixed clamping station to tear the film specimen. The system may include a slitter blade configured to cut the film specimen at a location between the fixed clamping station and the movable clamp. The system may include a load cell coupled to one of the fixed clamping
(Continued)

station and the movable clamp. The load cell may be configured to measure a force associated with tearing of the film specimen. The actuator may be configured to manipulate the movable clamp along a trajectory.

15 Claims, 11 Drawing Sheets

(51) Int. Cl.
*G01N 3/06* (2006.01)
*B25J 9/04* (2006.01)
*G01N 3/58* (2006.01)

(52) U.S. Cl.
CPC ....... *G01N 3/58* (2013.01); *G01N 2203/0017* (2013.01); *G01N 2203/0091* (2013.01); *G01N 2203/0206* (2013.01); *G01N 2203/0278* (2013.01); *G01N 2203/0282* (2013.01); *G01N 2203/04* (2013.01); *G01N 2203/0617* (2013.01)

(58) Field of Classification Search
CPC ....... G01N 2203/0282; G01N 2203/04; G01N 2203/0617; G01N 2203/006; G01N 2203/0206; G01N 2203/0278; B25J 9/044; B25J 15/00
USPC .......................................... 73/839, 835, 159
See application file for complete search history.

(56) References Cited

U.S. PATENT DOCUMENTS

| 5,437,192 | A | | 8/1995 | Kawamoto et al. |
| 6,139,889 | A | * | 10/2000 | Guinee .................. G01N 3/04 |
| | | | | 426/478 |
| 2010/0300195 | A1 | | 12/2010 | Coulter et al. |

OTHER PUBLICATIONS

Examination Report dated Feb. 10, 2022, pertaining to EP Patent Application No. 18731551.0, 6 pgs.
Translation of Japanese Office Action dated Apr. 12, 2022, pertaining to Japanese Patent Application No. 2020-503762, 6 pgs.

* cited by examiner

DEVICE FOR TEAR ANALYSIS OF FILMS

FIELD

The present invention relates to a device for tear analysis of a film or sheet of material.

INTRODUCTION

Characterizing physical properties of materials is useful in analyzing and improving chemical formulations employed in the production of the materials as well as in analyzing and improving processes of manufacturing the materials. Characterizing the physical properties may also help consumers determine the best product for their particular use case, as well as help researchers develop novel solutions for specific applications.

One of the useful physical properties of a material is determining tear strength of the material. A tear test provides insight into the ability of a material to resist tearing. For example, the tear test can be used for determining tear properties of thin films as thin films are often used in packaging applications. Tear testing can also be used for determining tear properties of polymeric samples such as adhesives, plaques, carpet fibers, non-woven fibers, etc., and in non-polymeric samples such as paper, cloth, foil, etc. The suitability of a material for an intended purpose may depend on the ability of the material to withstand or give way to tearing. In such instances, the chemical and physical characteristics of the material may affect the tear resistance of the material. The tear test usually involves performing a cut in a piece of film and tearing the film along the cut. The force required to propagate the tear is measured and analyzed to determine the material's tear resistance. The American Society for Testing and Materials (ASTM) has a set of standards that are widely used throughout the world for characterizing materials. Tear testing is a popular test that is performed frequently across the plastics industry. Currently, tear testing is performed using two methods: the Elmendorf test and the Trouser test. In both methods, a specimen is precut and a tear is propagated from the precut slit. The tests measure the average force required to propagate the tear through the specimen.

In the Elmendorf test, a user places a specimen on the tear tester where it is held on one side by a pendulum and on the other side by a stationary member. The specimen is precut with a slit to initiate the tearing. The user releases the pendulum and acting by gravity, the pendulum swings through an arc, tearing the specimen from the precut slit. The loss in energy by the pendulum is indicated by a pointer on a scale which correlates to the average force required to tear the film. The Elmendorf test is a manual test which is based on the potential energy stored in the pendulum (i.e. the test is based on the weight of the pendulum); no motorized equipment is used to generate the motion. The Elmendorf test recommends the tear strength of the film to be measured should be within 20%-80% of the weight of the pendulum. Therefore, the weight of the pendulum must be changed based on the strength of the film to be tested. This usually involves changing of a weight (such as a disc weight) located on the pendulum.

The Trouser test is a less frequently used method for evaluating tear resistance of a specimen. In the Trouser test, a specimen is precut with a slit of a specific dimension creating two legs separated by the split. The tester comprises a fixed gripper which clamps a first leg of the specimen and a movable gripper which clamps the second leg of the specimen. To initiate the test, a mechanism moves the movable gripper to tear the film at a uniform velocity in a horizontal direction along the precut slit. The average force is measured by computing the area under the force vs. displacement curve returned by the test. In a Trouser test, the tear direction is limited to the horizontal direction. Additionally, in both the Elmendorf test and the Trouser test, a human operator is required to prepare the sample and load and unload the film in the equipment as well as remove tested film.

Therefore, a need remains for an automated instrumentation for performing a tear test and for analyzing the force profile during tearing of the sheet or film.

SUMMARY

It was determined that by using the device for tear analysis of films according to the present disclosure, the tear analysis process is automated and the data gathered from testing is improved.

According to an embodiment, a system for performing a tear test may include a fixed clamping station configured to hold a first portion of a film specimen, a movable clamp coupled to an actuator, the movable clamp configured to hold a second portion of the film specimen, wherein the movable clamp is configured to move in a direction away from the fixed clamping station to tear the film specimen, a slitter blade configured to cut the film specimen at a location between the fixed clamping station and the movable clamp, and a load cell coupled to one of the fixed clamping station or the movable clamp, the load cell configured to measure a force associated with tearing of the film specimen. The actuator may be configured to manipulate the movable clamp along a trajectory.

According to an embodiment, a method of performing a tear test may include clamping a first portion of a film specimen in a fixed clamping station, clamping a second portion of the film specimen in a movable clamp connected to an actuator, moving the second portion of the film specimen with the actuator, the actuator moving the movable clamp in a direction away from the first portion of the film specimen, and measuring a force profile along a tear propagated between the first portion of the film specimen and the second portion of the film specimen.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

In industrial applications, the process of testing tear resistance of a thin film of material may be automated. The idea for automated tear testing systems arises from a need for high throughput (HTP) testing in various industries. A higher rate of testing large amounts of data can be gathered relatively quickly and analyzed for trends, allowing more detailed studies to be conducted on areas of interest. One feature needed in the inception of an HTP testing setup is a continuous (or near continuous) operation. By allowing systems to run non-stop it increases the amount of testing performed. The system also allows an increase of the speed of a single test as compared to manual testing systems. This is accomplished using robotics to take the place of a human researcher or operator, as robots can run for longer periods of time without interruption. A second feature that may be used for increasing throughput of a system without sacrificing accuracy is to perform multiple tests in parallel. A third feature is that the system is repeatable and uniform as compared to human-based testing systems. By employing both of these features, a testing setup that can greatly increase the number of specimens tested can be developed. In an embodiment of the present disclosure, a film specimen may be fabricated and tested in 10 minutes with an automated system. In an embodiment of the present disclosure, HTP testing is achieved by using two robots working in parallel. For example, in an embodiment, a six-axis robot prepares the specimens for testing while a Selective Compliance Assembly Robot Arm or Selective Compliance Articulated Robot Arm (SCARA) robot tears the film specimens loaded in multiple tear stations.

Embodiments of the present disclosure can be integrated with the blown film fabrication line. Additionally, embodiments can be integrated into existing blown film labs. By being able to conduct tests automatically and relatively quickly, the labs would be able to clear out their backlog of tests using the present system.

Figure 1:
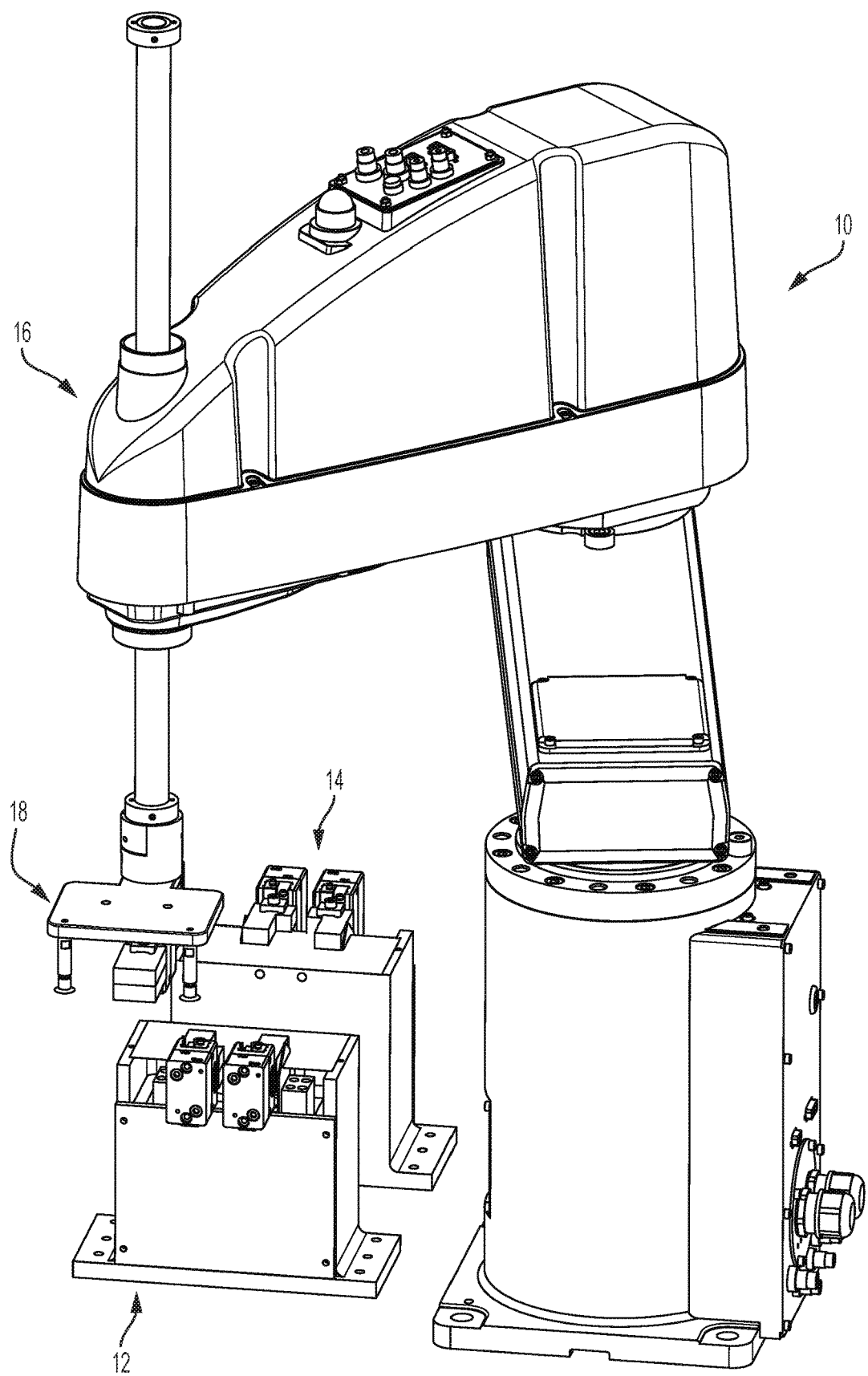
FIG. 1 shows a three-dimensional perspective view of a tear analysis device, according to an embodiment of the present disclosure.

FIG. 1 shows a three-dimensional perspective view of the tear analysis device 10, according to an embodiment of the present disclosure. The tear analysis device may be employed for HTP testing. The tear analysis device 10 may include a first fixed clamping station 12 and a second fixed clamping station 14. The first fixed clamping station 12 and the second fixed clamping station 14 may be of the same construction. That is, fixed clamping station 12 may be identical to fixed clamping station 14 such that both fixed clamping stations 12 and 14 have the same components. The tear analysis device 10 may also include a tear testing robot 16 capable of manipulating a movable clamp, such as a robotic clamp 18.

Figure 2:
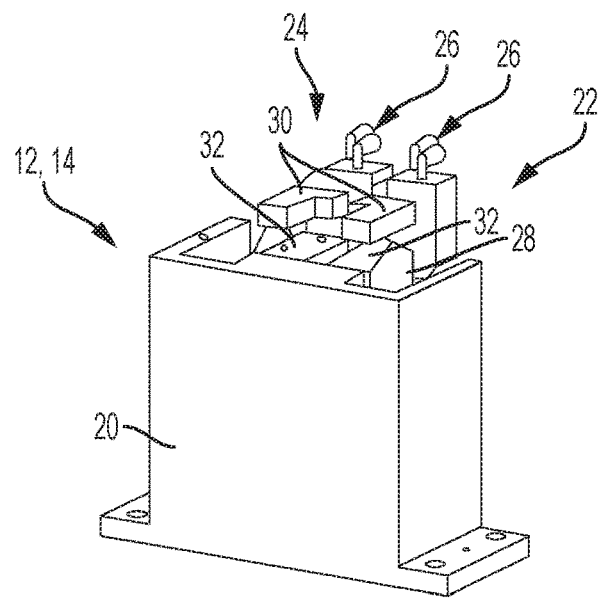
FIG. 2 shows a three-dimensional perspective view of a fixed clamp station of a tear analysis device, according to an embodiment of the present disclosure.

FIG. 2 shows a three-dimensional perspective view of fixed clamping stations 12 and 14, according to an embodiment of the present disclosure, where fixed clamping stations 12 and 14 are of the same construction. Fixed clamping stations 12, 14 may each include a base 20 for housing a first tear station 22 and a second tear station 24. Tear stations 22 and 24 may be of the same construction. Referring again to FIG. 1, four tear stations may be seen. That is, first clamping station 12 may have two tear stations (tear stations 22 and 24) and second clamping station 14 may have two tear stations (tear stations 22 and 24). For clarity of the description, a single tear station 22 on the first clamping station 12 will be described, however it is to be understood that the tear analysis device 10 may include four (two of each of tear station 22 and tear station 24) tear stations of the same construction as tear station 22. It is further understood that the tear stations 22 and 24 on the second fixed clamping station 14 may be the same as the tear station 22 described below.

Referring to FIG. 2, the tear station 22 may include a fixed clamp gripper 26 and a slitter blade 28. The fixed clamp gripper 26 may include an upper gripper finger 30 and a lower gripper finger 32. The lower gripper finger 32 and upper gripper finger 30 may be positioned such that a space exists between the top surface of the lower gripper finger 32 and the bottom surface of the upper gripper finger 30. During operation of the tear analysis device 10, a film specimen may be placed in the space between the lower gripper finger 32 and the upper gripper finger 30 (see FIG. 11). The upper gripper finger 30 may be actuated by an actuator 36 which moves the upper gripper finger 30 downward into engagement with the lower gripper finger 32. In this position, the bottom surface of the upper gripper finger 30 and the top surface of the lower gripper finger 32 engage the film specimen such that the film specimen is held firmly in place between the upper gripper finger 30 and lower gripper finger 32. In this position, the film specimen is held against movement during the tear test. As will be described to follow, after testing of the film specimen is complete, the upper gripper finger 30 and lower gripper finger 32 may be moved to the position of FIG. 2 such that the film specimen is no longer held in place between the gripper fingers 30 and 32.

Although the embodiment of FIG. 2 is described with actuation of the upper gripper finger 30 moving downward to engage the lower gripper finger 32, it is understood that either or both gripper fingers 30 and 32 may be moved to hold the film specimen. For example, the lower gripper finger 32 may be stationary. The upper gripper finger 30 may be moveable linearly in an upward and downward direction. Alternatively, the lower gripper finger 32 may be moveable and the upper gripper finger 30 may be stationary or both gripper fingers 30 and 32 may be moveable. Alternative devices which may grip a film specimen in place during a tear test may also be considered.

Figure 3:
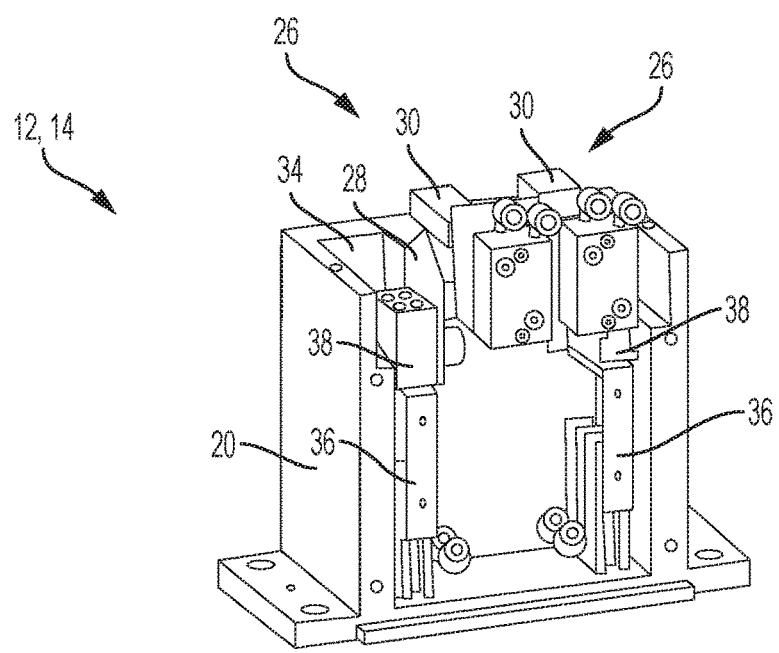
FIG. 3 shows a three-dimensional perspective view of a fixed clamp station of a tear analysis device, according to an embodiment of the present disclosure.

FIG. 3 shows a three-dimensional perspective view of the fixed clamp stations 12 and 14, from approximately the opposite side from shown in FIG. 2. From this view, the slitter blade 28 and a hollow space 34 of tear station 22 can be seen. The hollow space 34 may accommodate the robotic clamp 18 during a tear testing procedure. The tear station 22 (and tear station 24) may include an actuator 36 for actuating the fixed clamp gripper 26 and/or the slitter blade 28. The actuator 36 may be a pneumatic actuator. Alternatively, the actuator 36 may be a hydraulic, electric, mechanical, magnetic, thermal, or other known actuation device. The fixed clamp grippers 26 may have an upper gripper finger 30 and lower gripper finger 32 which may be actuated between an open position (FIG. 2) and a closed position (not depicted), as previously described. One example of such fixed clamp grippers 26 may be Schunk MPG50 grippers. The slitter blade 28 may have a slitter blade actuator 38. The slitter blade actuator 38 may actuate the slitter blade 28 to cut a film specimen to allow for initiation of the tear propagation. The slitter blade actuator 38 may actuate the slitter blade 28 between a retracted (not depicted) and extended position (FIGS. 2 and 3). In the retracted position, the slitter blade 28 may not extend past the top surface of the lower gripper finger 32. In the extended position, the slitter blade 28 may extend upward, past the top surface of the lower gripper finger 32 such that it initiates a cut into a film specimen gripped between the lower gripper finger 32 and upper gripper finger 30 in the manner previously described. The slitter blade actuator 38 may be operated pneumatically in a linear direction along the vertical axis of the fixed clamp station 12 or 14. The slitter blade actuator 38 may alternatively be a hydraulic, electric, mechanical, magnetic, thermal, or other known actuation device. Although the slitter blade 28 is described and depicted as coupled to the fixed clamping stations 12 and 14, it is understood that the slitter blade 28 may be provided on other components which locate the slitter blade between the fixed clamp grippers 26.

Figure 4:
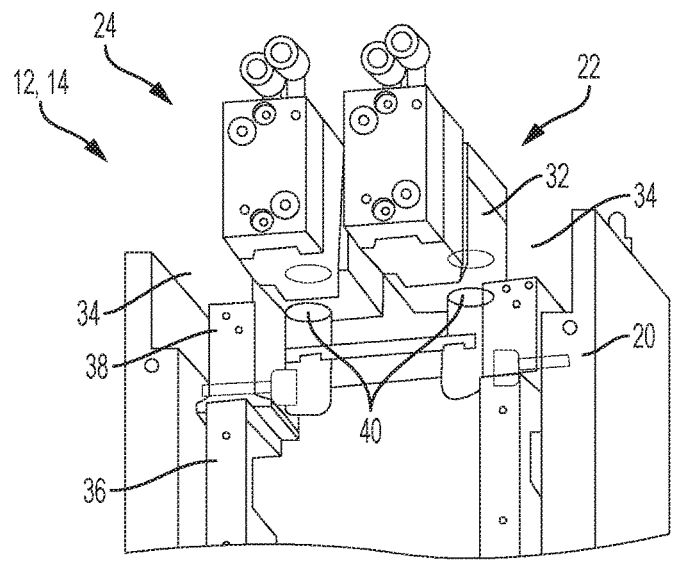
FIG. 4 shows a three-dimensional perspective view of a fixed clamp station of a tear analysis device, according to an embodiment of the present disclosure.

FIG. 4 shows a three-dimensional perspective view of a portion of the fixed clamping stations 12 and 14. The tear station 22 (and tear station 24) of fixed clamping station 12 (and fixed clamping station 14) may include a load cell 40. The bottom portion of the load cell 40 may be mounted to the base 20 of fixed clamping station 12. The top portion of the load cell 40 may be mounted to the bottom surface of the lower gripper finger 32. According to an embodiment, the load cell 40 may be the only point of support (via the bottom surface of the lower gripper finger 32) between the fixed clamp grippers 26 and the base 20. Such an arrangement allows the load cell 40 to accurately measure the tear force. That is, fixed clamp gripper 26 may impart a pulling action on the load cell 40 during the tearing of the film specimen, and the load cell 40 thus measures the tension force. The load cell 40 may comprise a multi-axis load cell, such as a six-axis load cell or a single axis load cell. An exemplary six-axis load cell may be an ATI Industrial Automation FT17900, Nano 25 sensor. An exemplary single axis load cell may be a PCB Piezotronics ICP Force Sensor, Model 208CO2. Although the load cell 40 is described and depicted on the fixed clamping stations 12 and 14, it is understood that the load cell 40 may be coupled to a part of the robotic clamp 18, such as a gripper finger 46, 48 (FIG. 6).

As may be appreciated from the foregoing description, each fixed clamping station 12 and 14 may hold two specimens with their respective fixed clamp gripper 26. That is, tear station 22 on fixed clamping station 12 may hold a first specimen and tear station 24 on fixed clamping station 12 may hold a second specimen. Tear station 22 on fixed clamping station 14 may hold a third specimen and tear station 24 on fixed clamping station 14 may hold a fourth specimen. Thus, the embodiment depicted in FIG. 1 is capable of accommodating testing of four film specimens, however different quantities are possible in different embodiments. The film specimens may be of any dimension, for example, each testing specimen may be a 3"×3" (76 mm×76 mm) specimen. The specimens may be cut from a larger 6"×6" (152 mm×152 mm) film sample. The film specimens may be polymer films, as described herein, other polymeric materials such as adhesives, plaques, carpet fibers, non-woven fibers, etc., or non-polymeric samples such as paper, cloth, foil, etc.

Figure 5:
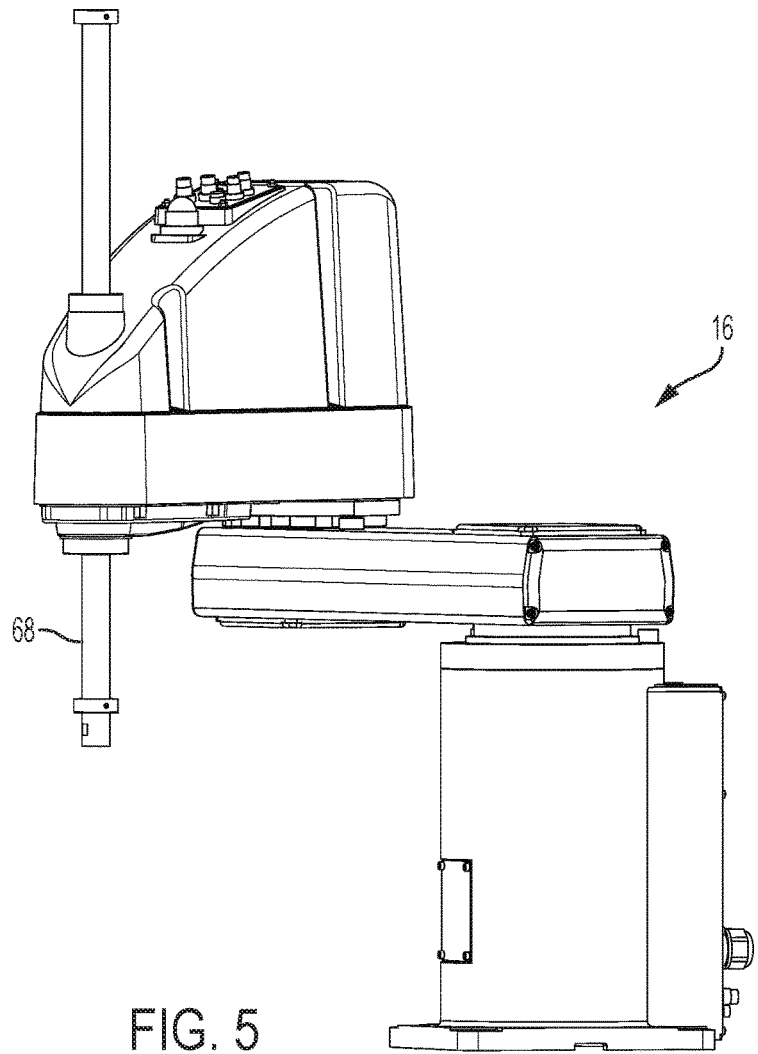
FIG. 5 shows a three-dimensional perspective view of a tear testing robot of the tear analysis device, according to an embodiment of the present disclosure.

FIG. 5 shows a three-dimensional perspective view of the tear testing robot 16, according to an embodiment of the present disclosure. The tear testing robot 16 may be a 4-axis robot which can move in the X-Y plane and in the vertical Z-direction and rotate about the Z-axis. According to an embodiment, the tear testing robot 16 may be an Epson SCARA robot model G10-854S. The tear testing robot 16 may be any robot which is capable of movement within at least the X-Y plane to accommodate the tearing of the film specimen. The robot may be any robot which can be programmed to tear the material specimen in a number of directions, for example, angular, straight, vertical, horizontal, and circular. In an embodiment, the robot is programmed to tear the specimen in the vertical direction and the motion parameters for the robot are set at a maximum linear velocity of 1325 mm/s (4.4 ft/s) and acceleration of 10000 mm/s$^2$ (32.8 ft/s$^2$).

Figure 6:
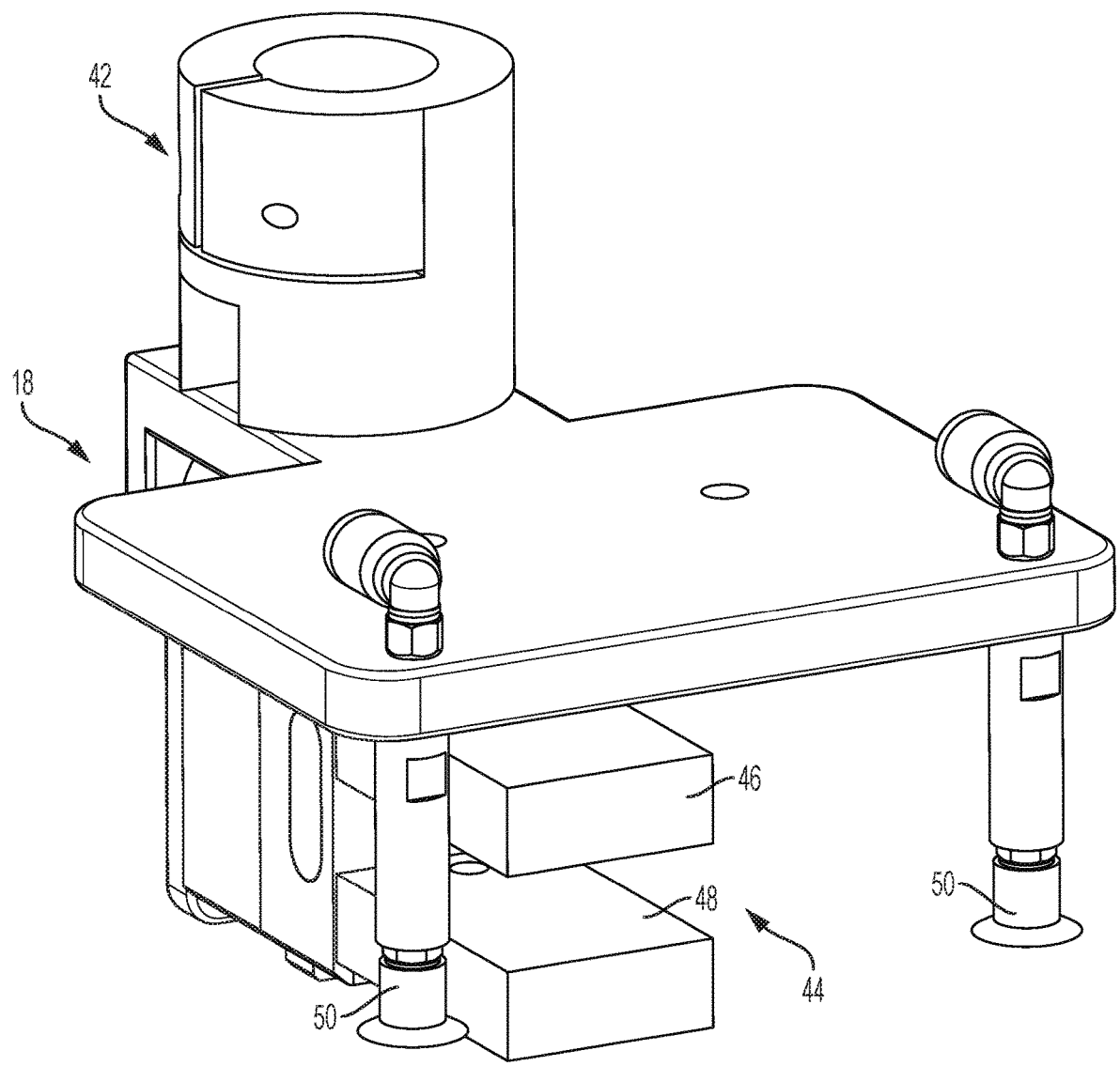
FIG. 6 shows a three-dimensional perspective view of a robotic clamp of the tear analysis device, according to an embodiment of the present disclosure.

FIG. 6 shows a three-dimensional perspective view of the robotic clamp 18. The robotic clamp 18 may be connected to the tear testing robot 16 via connector 42. The connector 42 may be cylindrical such that a shaft 68 (FIG. 5) of the tear testing robot 16 may be located in an opening of the cylindrical connector 42. Once inserted into the opening, a fastener may be provided in the connector 42 to secure the connector 42 to the shaft 68 of the tear testing robot 16. Other configurations for attaching the robotic clamp 18 to the tear testing robot 16 are also possible.

Figure 12:
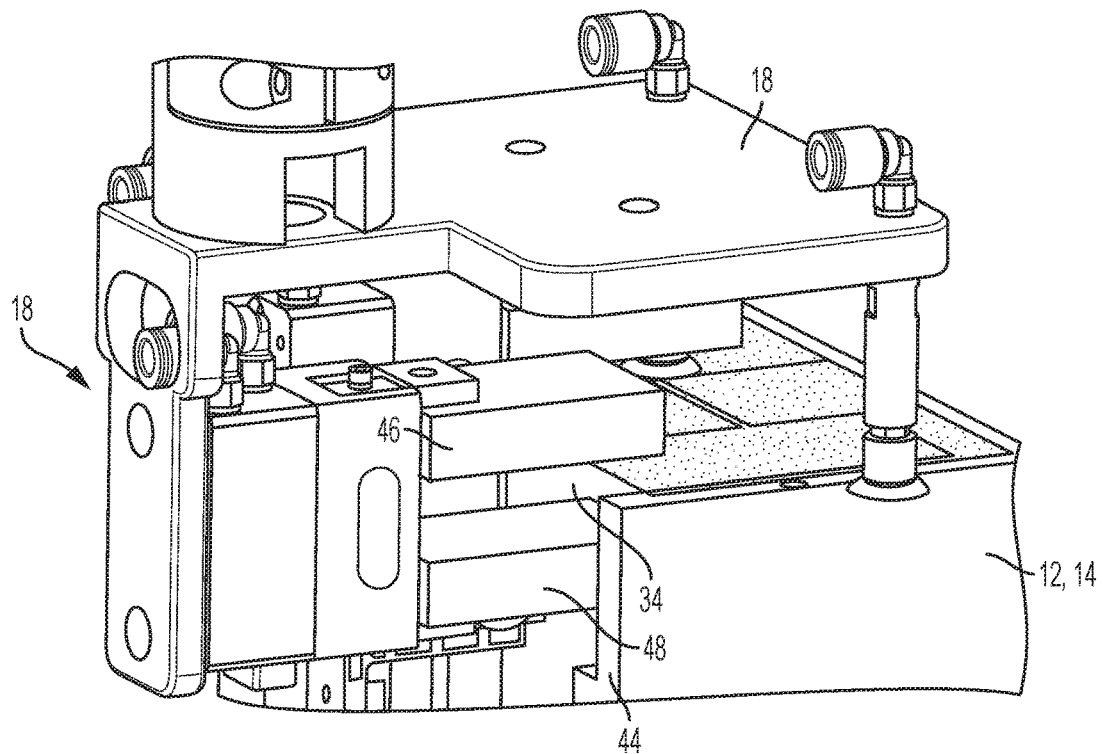
FIG. 12 shows a three-dimensional perspective view of a robotic clamp and a fixed clamping station with a piece of film located therein, according to an embodiment of the present disclosure.

With continued reference to FIG. 6, the robotic clamp 18 may include a gripper clamp 44. The gripper clamp 44 may comprise an upper gripper finger 46 and a lower gripper finger 48. The upper gripper finger 46 and lower gripper finger 48 may hold the sample during the tear test (FIG. 12). The gripper fingers 46 and 48 may be actuated to move linearly between an open position (FIG. 6) and a closed position (not depicted). The actuator may be pneumatic, hydraulic, mechanical, electrical, magnetic, thermal, or other known actuation device. In operation, a specimen is gripped in a tear station 22 (or tear station 24) in the manner previously described. The robotic clamp 18, in the open position of FIG. 6, is moved into hollow space 34 (FIG. 4) such that the film specimen is located between the upper gripper finger 46 and the lower gripper finger 48. The gripper clamp 44 is then actuated such that the upper gripper finger 46 and lower gripper finger 48 move linearly toward each other to engage the film specimen. In this closed position, the upper gripper finger 46 and lower gripper finger 48 each engage the film specimen in a portion adjacent to the portion engaged by the upper gripper finger 30 and lower gripper finger 32 of the tear station 22. During the tear test, the robotic clamp 18 is moved in the desired direction and due to the hold the gripper fingers 46 and 48 impart on the film specimen, this portion of the specimen is pulled away from the portion of the specimen which is held by the fingers 30 and 32 of the fixed clamping station 12. As will be described to follow, after testing of the film specimen is complete and the specimen is moved to the disposal container, the upper gripper finger 46 and lower gripper finger 48 may be moved to the position of FIG. 6 such that the film specimen is no longer held in place between the gripper fingers 46 and 48.

Although the embodiment of FIG. 6 is described with actuation of the upper gripper finger 46 and lower gripper finger 48 moving toward one another, it is understood that either or both gripper fingers 46 and 48 may be moved to hold the film specimen. For example, the lower gripper finger 48 may be stationary. The upper gripper finger 46 may be moveable linearly in an upward and downward direction. Alternatively, the lower gripper finger 48 may be moveable and the upper gripper finger 46 may be stationary or both gripper fingers 46 and 48 may be moveable. Alternative devices which may grip a film specimen in place during a tear test may also be considered.

Still referring to FIG. 6, the robotic clamp 18 may include vacuum cups 50 for collecting and dispensing of the torn specimen after the test. Although two vacuum cups 50 are shown, any number of vacuum cups may be used to collect and dispense of the specimen.

Figure 9:
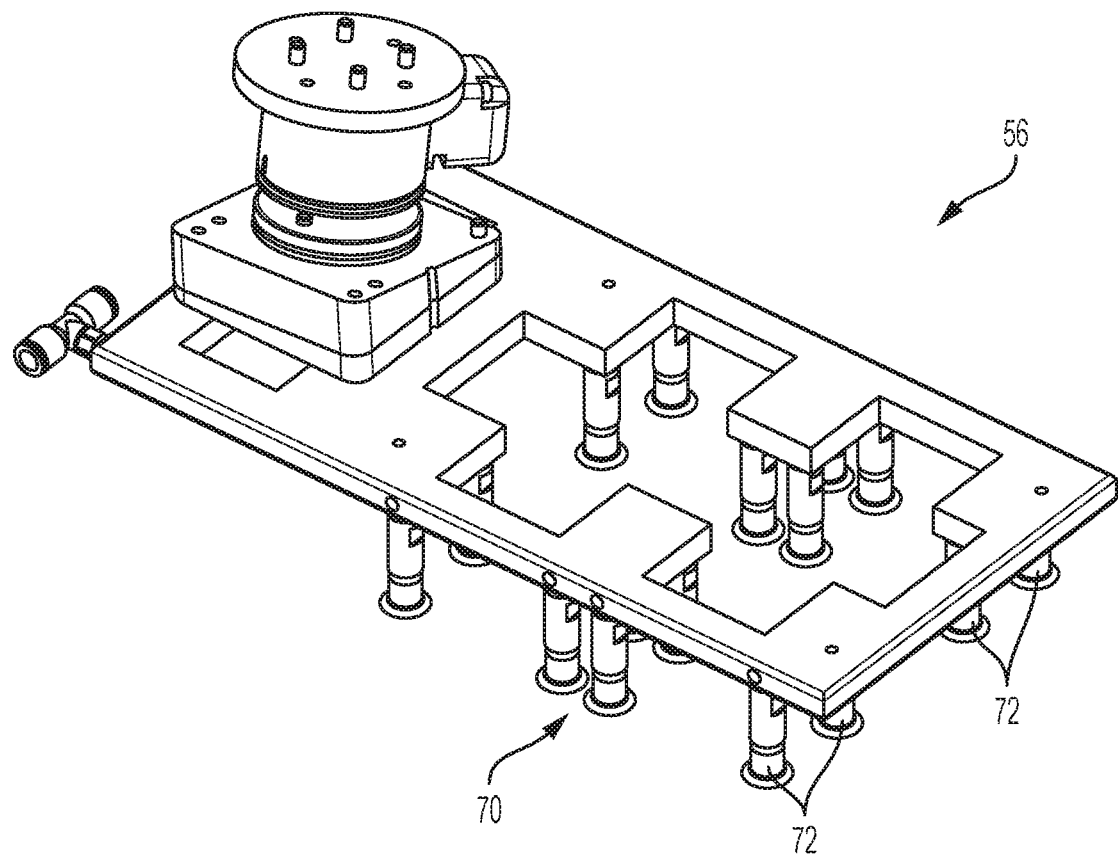
FIG. 9 shows a three-dimensional perspective view of a material holder system, according to an embodiment of the present disclosure.

Referring to FIG. 9, the material holder system 56 according to an embodiment of the present disclosure is shown. The material holder system 56 is configured to hold and move the film sample, before and after being cut into smaller specimens. In an embodiment, the material holder system includes a vacuum suction system 70 adapted to hold the film through vacuum suction. In an embodiment, the vacuum suction system 70 includes four sets of vacuum cups 72. Each set may include four vacuum cups 72. This allows for the material holder system 56 to handle either a single film sample of dimension 6"×6" (152 mm×152 mm) or four cut film specimens of size 3"×3" (76 mm×7 6mm). One of ordinary skill in the art will recognize that when a 6"×6" (152 mm×152 mm) film sample is handled by the material holder system 56, all sixteen vacuum cups 72 can be employed to hold and move the film. When four film specimens of size 3"×3" are handled by the material holder system 56, each set of four vacuum cups 72 can hold and move a respective film specimen. The material holder system 56 may hold and move the four specimens simultaneously. Although sixteen vacuum cups 72 are described and shown, any number of suction cups may be used to hold and move the film through the testing process. Additionally, although square film samples sized 6"×6" (152 mm×152 mm) are described herein, other shapes and sizes of samples can be used. Likewise, although the film samples are described herein as being cut into four square specimens sized 3"×3" (76 mm×76 mm), other shapes, sizes, and quantities of cut specimens can be used.

As it must be appreciated, although suctions cups are described herein as being used to hold the film, other mechanisms or systems can also be used to hold the film depending on the type of material. For example, the suction cups may be well suited for holding non-porous and relatively light samples, such as various plastics and polymer materials. Therefore, if, for example, porous materials are used, then the suction cups may be replaced by other holding mechanisms such as magnets or some other type of gripper.

Figure 7:
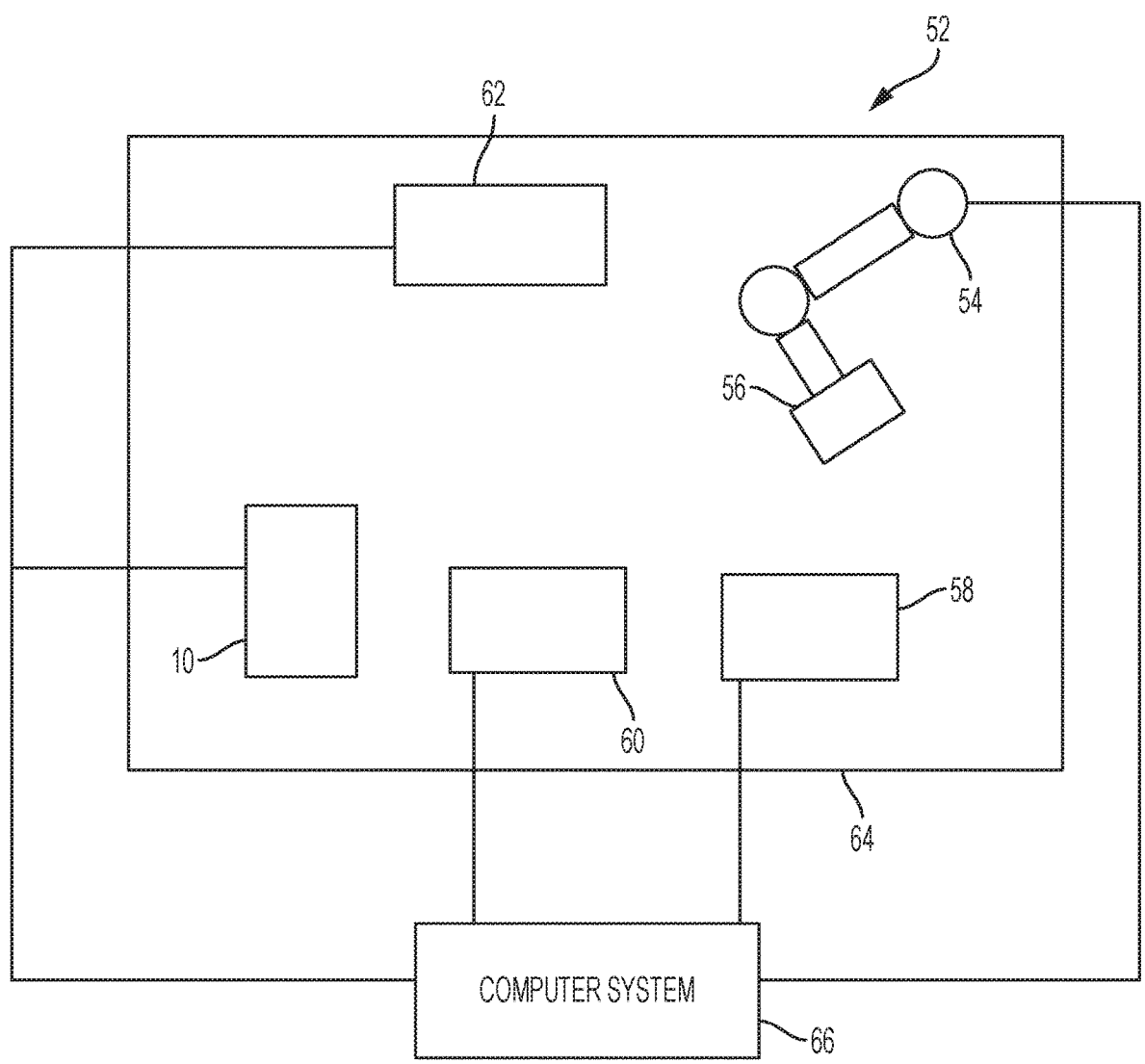
FIG. 7 shows a schematic diagram of a tear analysis system, according to an embodiment of the present disclosure.

FIG. 7 shows a schematic of a tear testing system 52 which may employ a tear analysis device 10, according to an embodiment of the disclosure. In operation, the tear testing system 52 may perform the following steps:
  (a) picking up a film sample by a movable system, such as a robotic system 54 using a material holder system 56,
  (b) measuring a thickness of the film sample using a thickness measurement system 58,
  (c) cutting the film sample from a 6"×6" (152 mm×152 mm) square into four 3"×3" (76 mm×76 mm) film specimens using a specimen cutter 60,
  (d) placing the four 3"×3" (76 mm×76 mm) specimens into the tear analysis device 10, and
  (e) tearing the four 3"×3" (76 mm×76 mm) specimens and disposing of the tested specimens.
  (f) Optionally, the system may perform a material image analysis of the specimens using the material image analyzer system 62.

With respect to step (a), a 6"×6" (152 mm×152 mm) film sample is transported to a work surface 64 via a transport system. The sample can have a sample identification to associate the resultant test data with the sample, for example, a Library ID and/or a file naming convention. The tear testing system 52 may include a delivery system. The delivery system may include trays which deliver samples to the work surface 64 for testing with the tear testing system 52. The delivery system may deliver a film sample to a location in front of the tear testing system 52 where the robotic system 54 and material holder system 56 may retrieve the film sample from the tray and proceed through the steps of the testing procedure described herein.

With respect to step (b), the robotic system 54 may move the material holder system 56, which is holding the film sample, to the thickness measuring system 58. The thickness measuring system 58 may include sensors having contact surfaces to measure the thickness of the film sample. As the sample may be cut from a 6"×6" (152 mm×152 mm) sample to four 3"×3" (76 mm×76 mm) specimens, the thickness measuring system 58 may have four sensors and respective contact surfaces to measure a thickness of the 6"×6" (152 mm×152 mm) film sample in four separate areas. In this manner, a thickness of each of the four 3"×3" (76 mm×76 mm) specimens may be measured prior to cutting of the sample. The thickness measurement system 58 may include high-accuracy digital contact sensors. The sensors may be Keyence GT2 Series from Keyence Company. According to an alternative embodiment, the thickness measuring system 58 may be configured to measure the thickness of each individual film specimen after cutting.

Continuing to step (c), the robotic system 54 moves the material holder system 56, which is holding the film sample, from the thickness measuring system 58 to the specimen cutter 60. The specimen cutter 60 cuts the film into smaller sizes. For example, the specimen cutter can cut a 6"×6" (152 mm×52 mm) film sample into four specimens sized 3"×3" (76 mm×76 mm). The specimen cutter 60 may include first and second linear actuators, such as linear motors, positioned perpendicular to each other, although other angular relationships may be provided. Each motor can drive a blade. In one instance, the linear motor moves the blade at from 1 m/s to 4 m/s (3.3 ft/s to 13.1 ft/s). The first linear motor can drive a first blade to make a first cut through the film sample. After the first blade has finished its cut and moved out of the way, the second linear motor can drive the second blade to make a second cut through the film sample, e.g., perpendicular to the first cut. This results in the film sample being cut into four smaller specimens. The four specimens are gripped with the vacuum cups 72 of the material holder system 56, and the robotic system 54 moves the specimens to the material image analyzer system 62.

Figure 8:
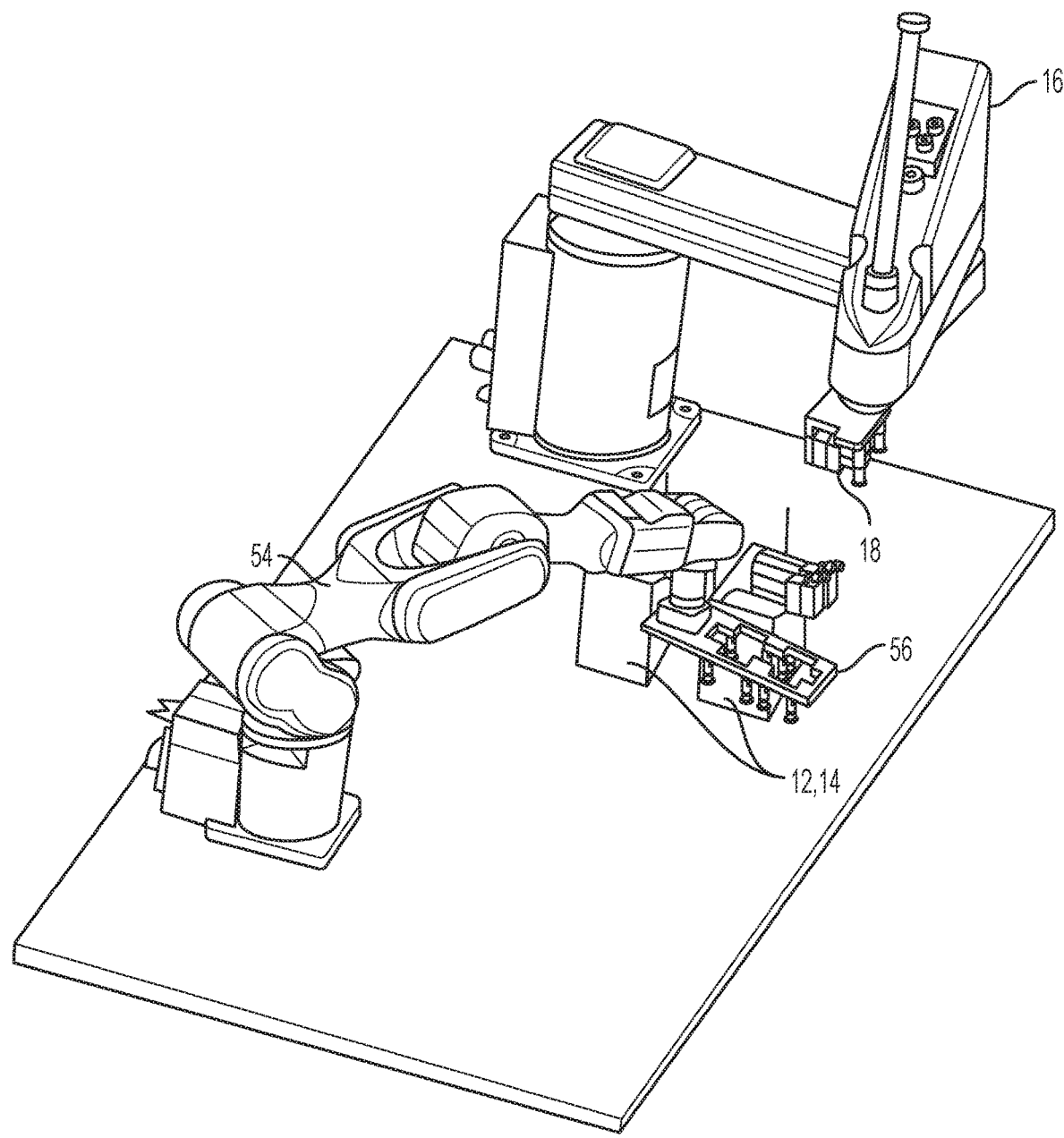
FIG. 8 shows a three-dimensional perspective view of a tear analysis device in use with a robotic system, according to an embodiment of the present disclosure.
Figure 10:
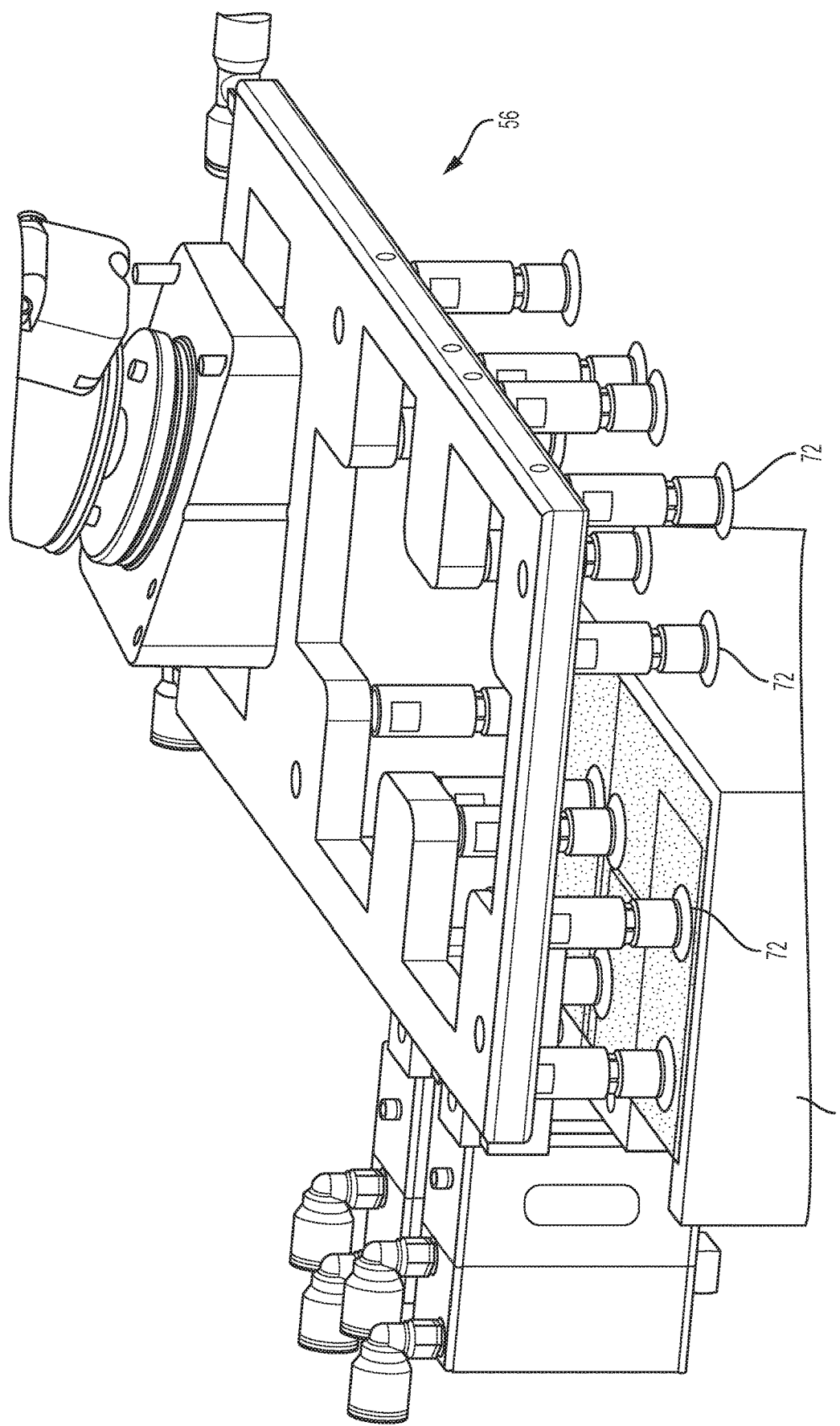
FIG. 10 shows a three-dimensional perspective view of a material holder system placing a piece of film in a fixed clamping station, according to an embodiment of the present disclosure.
Figure 11:
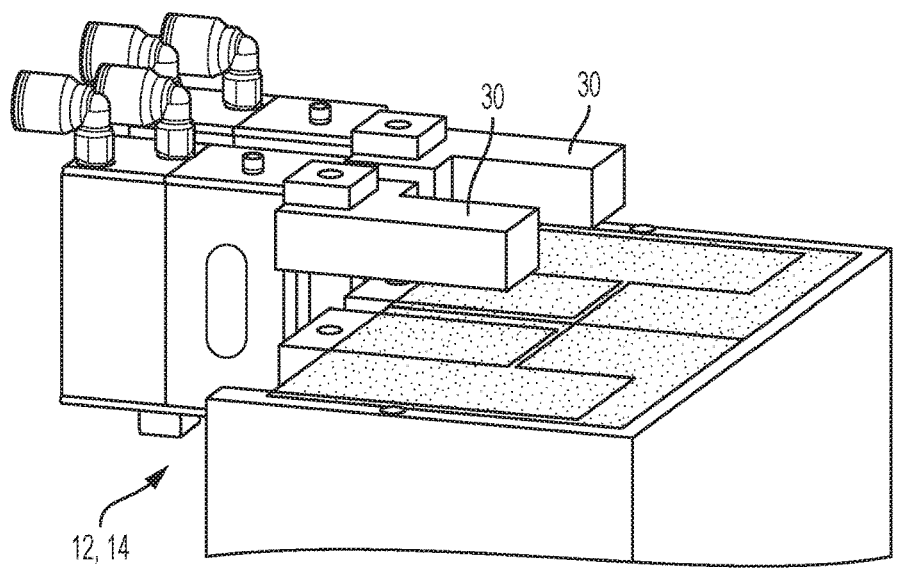
FIG. 11 shows a three-dimensional perspective view of a fixed clamping station with a piece of film located therein, according to an embodiment of the present disclosure.

Referring to FIG. 8, in step (d), the robotic system 54 moves the material holder system 56, and the four specimens held thereby, to the first and second fixed clamp stations 12, 14 of the tear analysis device 10. The robotic system 54 locates two of the 3"×3" (76 mm×76 mm) specimens between the gripper fingers 30 and 32 of the fixed clamp grippers 26 on both tear stations 22 and 24 of a first fixed clamp station 12 (FIG. 10). The actuator 36 is actuated to hold the two specimens between the gripper fingers 30 and 32, as described with respect to FIGS. 2-4. The vacuum cups 72 are released from the first two specimens. FIG. 11 depicts the first two film specimens delivered to the first clamping station 12. Although FIG. 11 depicts the gripper fingers 30 and 32 in the open position for clarity, it will be understood that at this point in the process, the gripper fingers 30 and 32 will be closed thus securing the film specimen.

The robotic system 54 and material holder system 56 then locate the remaining two of the 3"×3" (76 mm×76 mm) specimens between the gripper fingers 30 and 32 on both tear stations 22 and 24 of a second fixed clamp station 14 located opposite of the first fixed clamp station 12 (similar to FIGS. 10 and 11). The actuator 36 is actuated to hold the remaining two specimens between the gripper fingers 30 and 32 of the second fixed clamp station 14, as described with respect to FIGS. 2-4. The vacuum cups 72 are released from the remaining two specimens. The robotic system 54 moves the material holder system 56 away from the second fixed clamp station 14.

At this point in time, the robotic system 54 has delivered all four specimens to the tear analysis device 10. The robotic system 54 may now retrieve another uncut film sample from the transport system and begin steps (a) through (e) again while the tear testing robot 16 performs step (f), the test on the first four specimens. Such simultaneous or substantially simultaneous operation of the robotic system 54 and the tear testing robot 16 allows for high throughput of film testing.

With respect to step (e), and as seen in FIG. 12, the robotic clamp 18 is moved to the first clamp station 12 to perform a tear test on the two specimens held by tear stations 22 and 24 of first clamp station 12. The first specimen is held by gripper fingers 30 and 32 of the tear station 22. The gripper clamp 44 of the robotic clamp 18 is moved to the hollow space 34 in the tear station 22. The gripper fingers 46 and 48 are actuated to grip another portion of the first specimen. It may be appreciated from FIGS. 3 and 12, that there are two gripped portions of the specimen, the portion gripped by fixed clamp gripper 26 and the portion gripped by gripper clamp 44 of the robotic clamp 18. It may also be appreciated that there may be a space between the two gripped portions that may accommodate the slitter blade 28.

Figure 13:
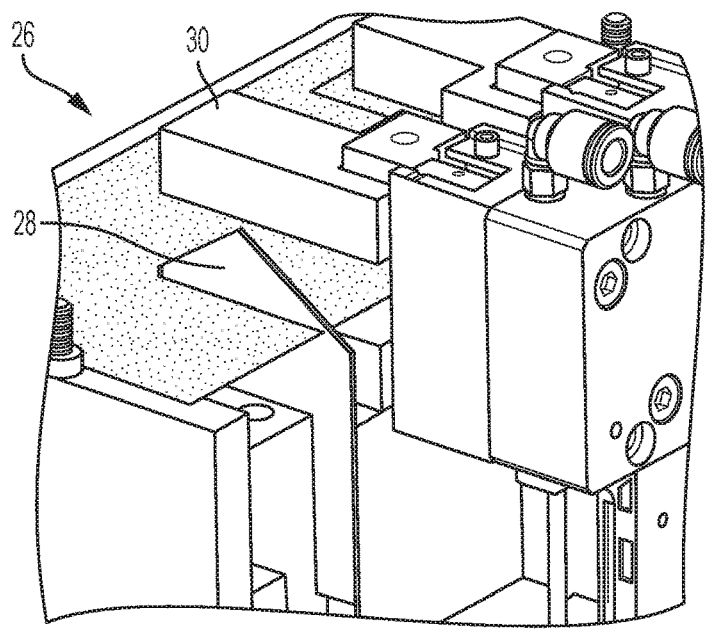
FIG. 13 shows a three-dimensional perspective view of a slitter blade in a fixed clamping station with a piece of film located therein, according to an embodiment of the present disclosure.

Referring now to FIG. 13, the slitter blade 28 is actuated by the actuator 38 (not shown in FIG. 13) to cut a slit into the first specimen. The view in FIG. 13 omits the robotic clamp 18 and depicts the gripper fingers 30 and 32 in the open position for clarity of description. However, it will be appreciated that at this point in the process, the gripper fingers 30 and 32 are in the closed position and the gripper fingers 46 and 48 of the robotic clamp 18 are also in the closed position around the specimen, such that there is a gripped portion on either side of slitter blade 28. The slit may be created by the slitter blade 28 in the space between the two previously mentioned gripped portions.

Figure 14:
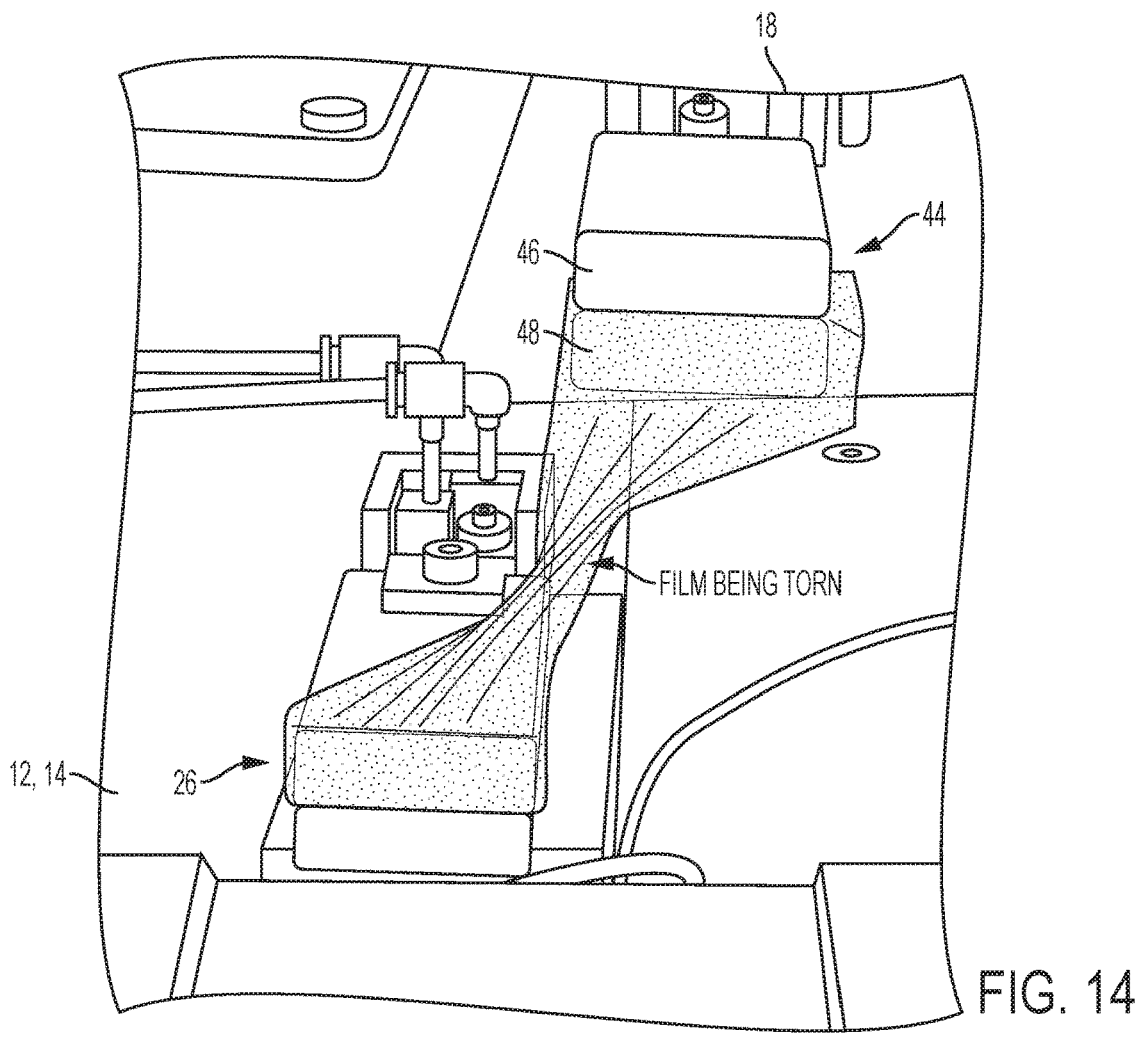
FIG. 14 shows a three-dimensional perspective view of a robotic clamp pulling a piece of film in a direction away from a fixed clamping station, according to an embodiment of the present disclosure.

Referring to FIG. 14, once the slit has been formed, the robotic clamp 18 may be moved in an upward, vertical motion by the tear testing robot 16. This motion may propagate a tear along the slit, such that the specimen is torn into a first portion and a second portion. The first portion may be gripped by the gripper clamp 44 of robotic clamp 18 and the second portion may be gripped by the fixed gripper clamps 26 of fixed clamping stations 12 and 14. The force profile is measured during the tear with the load cell 40.

The robotic clamp 18 may still be gripping the first portion of the tested specimen. The robotic clamp 18 may also be located at a location upward from the fixed clamp station 12 due to the upward travel of the robotic clamp 18 during the tear test. Continuing to grip the first portion of the test specimen, the robotic clamp 18 may then be lowered to a position proximate to the second portion of the tested specimen gripped in the tear station 22. The vacuum cups 50 of the robotic clamp 18 may be actuated to affix to the second portion of the film specimen. The fixed clamp grippers 26 may be released such that the second portion of the tested specimen is now held by the robotic clamp 18. Thus, the robotic clamp 18 may move the first portion of the tested specimen (the portion held by gripper fingers 46 and 48) and the second portion of the tested specimen (the portion held by vacuum cups 50) to a disposal site.

The disposal site may include a disposal container and a disposal mechanism, such as a brush or puff of air, to dislodge the film from the gripper fingers or the vacuum cups. The gripper fingers 46 and 48 may then be released such that the first portion of the tested specimen may fall into the disposal container or allow the disposal mechanism to dislodge the film. The robotic clamp 18 may be moved against the disposal mechanism to dislodge the second portion of the tested specimen from the vacuum cups 50. Once dislodged, the second portion of the tested specimen may fall into the disposal container.

After disposal of the first specimen, the robotic clamp 18 is returned to the first fixed clamp station 12 and repeats step (e) on the second film specimen held in the second tear station 24 of the first fixed clamp station 12. After disposal of the second specimen, the robotic clamp 18 is moved to the second fixed clamp station 14 and repeats the tear test and disposal of step (e) on the third and fourth specimens held in tear stations 22 and 24 of the second fixed clamp station 14.

According to embodiments, prior to any of steps (b), (c), and (d) the specimens may be analyzed for defects and irregularities using a material image analyzer system 62. The width of the specimens to be tested may also be measured with the material image analyzer system 62. The material image analyzer system 62 may be based on the principle of polarized light. A source of polarized light is used to illuminate the material specimen within the material image analyzer system 62, while eliminating any ambient light. After the light passes through the film specimen, it is captured by a camera fitted with a polarizing filter. A perfectly formed film specimen does not scatter the polarized light from the source thus resulting in a completely clear image. However, any imperfections/defects in the film specimen scatters light that are detected by the camera. A machine vision algorithm then identifies and tags film specimens with significant defects.

Although the process is described in the above order, it will be recognized that the order may be altered. According to embodiments, the order of operation of the steps may be chosen, for example, based on closeness of the components on the work surface 64 to promote efficiency of the system.

Although robotic clamp 18 is described and depicted for propagating the tear in the 3"×3" (76 mm×76 mm) specimen, other alternatives may be employed, such as linear motors, other types of robotic systems, and automated picking and placing of a dead weight for gravity drop tears.

Although robotic clamp 18 is described as propagating the tear through an upward, vertical motion, other alternative trajectories may be employed. The robotic clamp 18 (or other tear propagation mechanism) may be programed to perform the tear motion in linear trajectories (vertical and horizontal) or in angular, circular or spline trajectories. Additionally, the acceleration, velocity, and travel distance of the robotic clamp 18 may be programmed. A variable acceleration motion, such as a sinusoidal curve (i.e. acceleration curve for a pendulum) can be programmed. Embodiments of the present disclosure allow for a wide range of speed and acceleration parameters for tearing. In embodiments, the max acceleration of the robotic clamp 18 may be set to 1 g (9.81 m/s). However, other accelerations or combinations of speed and acceleration may be selected.

Furthermore, different types of load cells 40 can be used to measure the force profile along the tear. The type of load cell chosen may depend on several factors including the range of the load cell (which is dependent on the maximum tear strength force to be measured), the resolution of the load cell (which is based on the desired precisions and accuracy of the measurement), and the degree of force measurement of the load cell (which is dependent on the requirement for detailed tear analysis of the material specimen). A six-axis load cell can be used to measure and analyze the tear force in each of the six directions ($F_x$, $F_y$, $F_z$, $T_x$, $T_y$, $T_z$) or a single axis load cell can be used to measure force in the direction of the tear.

The equipment in the tear analysis device 10 may be used with different specimen dimensions. The tear equipment can be used for the dimensions specified in the ASTM D1922 standard, or with other dimensions such as a 3"×2.5" (76.2×68.6 mm) rectangle or 3"×3" (76 mm×76 mm) square. The equipment in the tear analysis device 10 may also be used with different materials. The material may be polymer films, as described herein, or alternatively, polymeric samples including adhesives, plaques, carpet fibers, non-woven fibers, etc., or in non-polymeric samples such as paper, cloth, foil, etc.

In an embodiment, the computer system 66 in communication with the tear testing system 52 is configured to collect or acquire force data from the tear analysis device 10. The computer system 66 includes a user interface to allow the user to enter test parameters such as the identification of the film sample or film specimen so that the results (e.g., from the thickness measurement system, image analyzer system, and tear analysis device) can be stored into a database linking it to the correct identification. The user interface also allows changes to test parameters such as tear distance, speed, and acceleration. The computer system 66 may control both the robotic system 54 and the tear analysis device 10. The robotic system 54 may run on a main controller while the tear analysis device 10 may be connected as a slave to the main controller.

Figure 15:
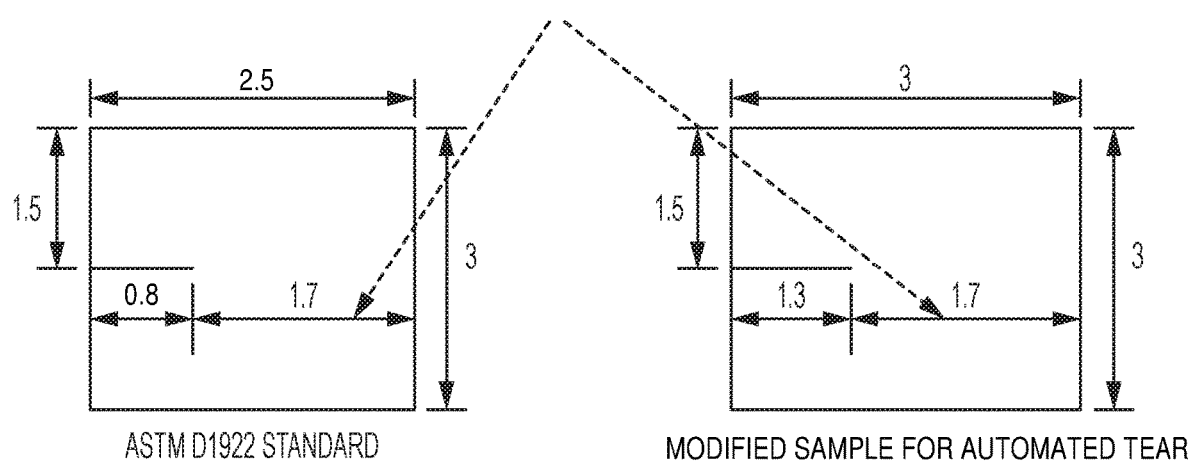
FIG. 15 shows a comparison between a standard test specimen and a modified test specimen, according to an embodiment of the present disclosure.

During testing of the specimen, the load cell 40 measures the tension force due to the specimen being pulled from the fixed clamp gripper 26. That is, since the load cell 40 is the only point of support for the lower gripper finger 32, the load cell 40 measures the tension force imparted by the fixed clamp gripper 26 (including lower gripper finger 32) when the specimen is pulled by the robotic clamp 18. The tension force measured by the load cell 40 correlates to the tear resistance of the film specimen. The load cell 40 measures the tension force during the entire tear procedure performed by the robotic clamp 18 and thus returns a force profile. The load cell 40 may measure force data at very high frequencies, for example about 7000 Hz and above, and can therefore provide a detailed force profile over the entire tear of the film. The force profile can be used to determine a peak force, a work performed during tear, and an average force required to perform the tear. In an embodiment, the specimen has the same length of tear (1.7") as in the original ASTM D1922 specimen (FIG. 15) and the force measured by the load cell 40 can thus be correlated to the ASTM D1922 standard. In embodiments when the load cell 40 is a six-axis load cell, the load cell 40 may measure force in all directions to give a more detailed analysis of tear properties, such as the angle of the tear plane. In contrast, the Elmendorf test produces a single number representing the average force required to tear the film. The average force returned represents only the force measured in the vertical direction.

In an embodiment, the force profile measured by the load cell 40 may be acquired by the computer system 66 in the form of a plot of force versus time for the tear duration of the film. From this data, the peak force required to tear the film specimen is calculated by finding the maximum force value in the force curve:

$$F_{peak} = \max(F)$$

The force versus time plot may be viewed as a force curve over the entire tear. The computer system 66 may also acquire a displacement curve for the tear duration. A force versus displacement curve can then be obtained and interpreted to obtain tear analysis information. The work done to tear the film is calculated by integrating the force curve over the distance traveled (displacement ($x_2 - x_1$)):

$$W = \int_{x1}^{x2} F(s).ds$$

Where W is the work done, F(s) is the force as a function of distance, x1 is the start of the tear, and x2 is the end of the tear. The average force is computed by dividing the computed work done required to tear the film over the distance traveled in tearing the film:

$$F_{avg} = \frac{W}{s}$$

Where s is the nominal length of the tear, for example for a film specimen with length of tear of 1.7 inches (43.2 mm), the nominal length of tear is 1.7×2=3.4 inches (86.4 mm). The peak force and average force are computed for each of the specimens in a sample size and the statistical parameters mean and standard deviation are computed from the sample size. The normalized value for each of the forces is computed as the force per mil thickness.

A person with the benefit of the present disclosure will appreciate that embodiments described herein may allow for a tear to be performed using motorized and/or automated equipment. Embodiments of the present disclosure may allow for tear strength measurement to be completely automated, including the loading and disposal of the sample. Employing an automated, motorized procedure may allow for the same or similar set-up and/or equipment to be used for a wide range of polymer films and other non-polymeric samples. There is no changing of weights for various samples with different tear strengths as in the Elmendorf test. Additionally, the tear trajectories can be defined by the same set-up. That is, the present disclosure allows for the same equipment to be used to perform different trajectories of tear, such as splines, circular, or horizontal tears. This means that the same equipment may be used to, for example, perform both an Elmendorf and Trouser Test.

The term "computer system" is used herein to encompass any data processing system or processing unit or units. The computer system may include one or more processors or processing units. The computer system can also be a distributed computing system. The computer system may include, for example, a desktop computer, a laptop computer, a handheld computing device such as a PDA, a tablet, a smartphone, etc. A computer program product or products may be run on the computer system to accomplish the functions or operations described in the above paragraphs. The computer program product includes a computer readable medium or storage medium or media having instructions stored thereon used to program the computer system to perform the functions or operations described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling a general purpose or specialized computer system or processor. The software also enables the computer system or processor to interact with a user via output devices such as a graphical user interface, head mounted display (HMD), etc. The software may also include, but is not limited to, device drivers, operating systems and user applications. Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods, functions or operations of the present disclosure.

The invention claimed is:

1. A system for performing a tear test, the system comprising:
    a first fixed clamping station configured to hold a first portion of a film specimen;
    a movable clamp coupled to an actuator, the movable clamp configured to hold a second portion of the film specimen, wherein the movable clamp is configured to move in a direction away from the first fixed clamping station to tear the film specimen;
    a slitter blade configured to cut the film specimen at a location between the first fixed clamping station and the movable clamp; and
    a load cell coupled to one of the first fixed clamping station or the movable clamp, the load cell configured to measure a force associated with tearing of the film specimen, and
    wherein the actuator is configured to manipulate the movable clamp along a trajectory.

2. The system of claim 1, further comprising a slitter blade actuator coupled to the slitter blade, wherein the slitter blade is driven by the slitter blade actuator to cut the film specimen.

3. The system of claim 1, wherein the load cell measures a tension force imparted on the one of the first fixed clamping station or the movable clamp during tearing of the film specimen.

4. The system of claim 1, wherein the load cell comprises a multi-axis load cell.

5. The system of claim 1, wherein the first fixed clamping station comprises a gripper configured to hold the first portion of the film specimen, wherein the load cell measures a tension force imparted on the gripper during tearing of the film specimen.

6. The system of claim 1, wherein the movable clamp comprises a gripper configured to hold the second portion of the film specimen.

7. The system of claim 1, wherein the actuator comprises a four-axis robot configured to move in an X-Y plane and in a Z-direction, and to rotate about any axis as the film specimen is tested in the Z-direction.

8. The system of claim 1, wherein the actuator is configured to move the movable clamp to tear the film specimen in at least one of a vertical direction, a horizontal direction, an angular direction, a circular direction, or a spline.

9. The system of claim 1, further comprising a second fixed clamping station configured to hold a second portion of a second film specimen, wherein the movable clamp is configured to be moved between the first fixed clamping station and the second fixed clamping station.

10. The system of claim 9, wherein the movable clamp is configured to hold a first portion of the second film specimen.

11. A method of performing a tear test, the method comprising:
    clamping a first portion of a film specimen in a fixed clamping station;
    clamping a second portion of the film specimen in a movable clamp connected to an actuator;
    moving the second portion of the film specimen with the actuator, the actuator moving the movable clamp in a direction away from the first portion of the film specimen; and
    measuring a force profile along a tear propagated between the first portion of the film specimen and the second portion of the film specimen.

12. The method of claim 11, wherein measuring the force profile along the tear comprises measuring the force profile during the entire tear propagated between the first portion of the film specimen and the second portion of the film specimen.

13. The method of claim 11, further comprising actuating a slitter blade to initiate a cut between the first portion of the film specimen and the second portion of the film specimen before tearing the film specimen.

14. The method of claim 11, further comprising determining one of a peak force, an average force, work performed, or an angle of tear plane of the tear propagated between the first portion of the film specimen and the second portion of the film specimen.

15. The method of claim 11, further comprising disposing of the first portion of the film specimen and the second portion of the film specimen after propagating the tear using the movable clamp.

* * * * *